US007008149B1

(12) United States Patent
Rhoades

(10) Patent No.: US 7,008,149 B1
(45) Date of Patent: Mar. 7, 2006

(54) TOOL KIT AND METHOD OF USING

(76) Inventor: Bernard G. Rhoades, 249 W. Main St., Port Jervis, NY (US) 12771

( * ) Notice: Subject to any disclaimer, the term of this patent is extended or adjusted under 35 U.S.C. 154(b) by 361 days.

(21) Appl. No.: 10/369,477

(22) Filed: Feb. 20, 2003

(51) Int. Cl.
*B23B 5/16* (2006.01)

(52) U.S. Cl. .................. 408/1 R; 408/80; 408/201; 408/204; 408/145

(58) Field of Classification Search ............ 408/1 R, 408/79, 80, 81, 145, 201, 204
See application file for complete search history.

(56) References Cited

U.S. PATENT DOCUMENTS

| | | | | |
|---|---|---|---|---|
| 1,316,201 A | * | 9/1919 | Tacke | 408/82 |
| 1,669,273 A | * | 5/1928 | Wojnowski et al. | 408/86 |
| 3,810,514 A | * | 5/1974 | Viscovich | 175/403 |
| 4,626,143 A | * | 12/1986 | Rembold | 408/82 |
| 4,755,088 A | * | 7/1988 | Vajda | 408/68 |
| 5,304,018 A | * | 4/1994 | LaVanchy et al. | 408/1 R |
| 5,366,326 A | * | 11/1994 | Converse | 408/72 B |
| 5,733,074 A | * | 3/1998 | Stock et al. | 408/17 |
| 5,820,315 A | * | 10/1998 | Collard | 408/80 |
| 6,725,697 B1 | * | 4/2004 | Leadon | 70/465 |
| 6,857,830 B1 | * | 2/2005 | Holcomb | 408/204 |
| 6,860,172 B1 | * | 3/2005 | Hecht | 76/108.6 |
| 6,881,017 B1 | * | 4/2005 | Krecek et al. | 408/204 |

\* cited by examiner

*Primary Examiner*—Boyer D. Ashley
*Assistant Examiner*—Ali Abdelwahed

(57) ABSTRACT

A new and improved tool kit and method of using the tool kit for use in making a substantially perpendicular indented surface around an existing threaded bolt hole in a workpiece is disclosed. The kit comprises a guide rod and a grinder drill bit. The guide rod has a threaded distal end that is able to be threadedly fitted within the threaded bolt hole of the workpiece. The guide rod also has a cylindrical proximate end which has a first diameter. The grinder drill bit has a shank adapted to be coupled to a shank lock of an electrical drill. The grinder drill bit also has an elongated hollow cylinder attached to the shank, in which the elongated hollow cylinder has a centrally disposed orifice. The centrally disposed orifice of the grinder drill bit has a internal slightly diameter larger than the first diameter of the cylindrical proximate end of the guide rod, so that the cylindrical proximate end of the guide rod can be slidably inserted within the centrally disposed orifice of the elongated hollow cylinder of the grinder drill bit. Finally the grinder drill bit has a cutting element attached to the distal end of the elongated hollow cylinder for grinding or cutting a fresh surface around the existing threaded bolt hole. The method of using the tool kit comprises the steps of activating, attaching, blowing, choosing, cutting, identifying, obtaining, locking, plugging, pressing, pulling, screwing, sliding, turning, and unscrewing.

12 Claims, 3 Drawing Sheets

TOOL KIT AND METHOD OF USING

FIELD OF THE INVENTION

The present invention relates to metal working tools, more particularly, to a tool kit for use in making an substantially perpendicular indented surface around an existing threaded bolt hole so that a bolt head can be firmly seated over this fresh surface.

DESCRIPTION OF THE PRIOR ART

It is well known in the mechanical arts that various metallic workpieces may occasionally be worked by removing the surface of the entire metallic workpiece. One problem that may arise is that the bolts that used to hold the workpiece to another part no longer firmly seat onto the workpiece because the surface has been altered. As a result, the bolt may not be able to be seated firmly enough to sufficiently hold the workpiece onto the other part.

A wide variety of drill tool kits is currently available on the commercial market and an even larger number of these types of devices are known in the art of drill tool kits, for example, the rock drill rod disclosed by Ditson in U.S. Pat. No. 3,554,308; the drill bit disclosed by Sandy et al. in U.S. Pat. No. 4,536,107; the all in one drill bit disclosed by Ippolito and Spector in U.S. Pat. No. 5,024,566; the engine block cylinder head bolt hole repair disclosed by Stafford in U.S. Pat. No. 5,025,556; the self-tapping, and sel-tapping and self-drilling, rock bolts disclosed by Gray in U.S. Pat. No. 5,433,558; and the detachable drill bit and fluted tap disclosed by Malin in U.S. Pat. No. D390,239.

While all of the above-described devices fulfill their respective, particular objectives and requirements, the aforementioned patents do not describe a tool kit having a guide rod which is slidably insertable into a grinding drill bit. These elements would specifically match the user's particular individual needs by making it possible to align the grinding drill bit over the a bolt hole so that the grinding drill bit may cut or grind a fresh surface around the bolt hole. The above-described patents make no provision for a tool kit having a guide rod which is slidably insertable into a grinding drill bit.

Therefore, a need exists for a new and improved tool kit that can be used for aligning a grinding drill bit over a bolt hole so that the grinding drill bit may cut or grind a fresh surface around the bolt hole. In this respect, the tool kit according to the present invention substantially departs from the conventional concepts and designs of the prior art, and in doing so provides an apparatus primarily developed for the purpose of providing a tool kit having a guide rod which is slidably insertable into a grinding drill bit. These elements make it possible to align the grinding drill bit with the bolt hole so that the grinding drill bit may cut or grind a fresh surface around the bolt hole.

SUMMARY OF THE INVENTION

The present tool kit and method, according to the principles of the present invention, overcomes the shortcomings of the prior art by providing a new and improved tool kit and method of using the tool kit for use in making a substantially perpendicular indented surface around an existing threaded bolt hole in a workpiece is disclosed. The kit comprises a guide rod and a grinder drill bit. The guide rod has a threaded distal end that is able to be threadedly fitted within the threaded bolt hole of the workpiece. The guide rod also has a cylindrical proximate end which has a first diameter. The grinder drill bit has a shank adapted to be coupled to a shank lock of an electrical drill. The grinder drill bit also has an elongated hollow cylinder attached to the shank, in which the elongated hollow cylinder has a centrally disposed orifice. The centrally disposed orifice of the grinder drill bit has a internal slightly diameter larger than the first diameter of the cylindrical proximate end of the guide rod, so that the cylindrical proximate end of the guide rod can be slidably inserted within the centrally disposed orifice of the elongated hollow cylinder of the grinder drill bit. Finally the grinder drill bit has a cutting element attached to the distal end of the elongated hollow cylinder for grinding or cutting a fresh surface around the existing threaded bolt hole. The method of using the tool kit comprises the steps of activating, attaching, blowing, choosing, cutting, identifying, obtaining, locking, plugging, pressing, pulling, screwing, sliding, turning, and unscrewing.

In view of the foregoing disadvantages inherent in the known type tool kits now present in the prior art, the present invention provides an improved tool kit, which will be described subsequently in great detail, is to provide a new and improved tool kit which is not anticipated, rendered obvious, suggested, or even implied by the prior art, either alone or in any combination thereof.

To attain this, the present invention essentially comprises a guide rod and a grinder drill bit. The guide rod has a threaded distal end that is able to be threadedly fitted within the threaded bolt hole of the workpiece. The guide rod also has a cylindrical proximate end which has a first diameter. The grinder drill bit has a shank adapted to be coupled to a shank lock of an electrical drill. The grinder drill bit also has an elongated hollow cylinder attached to the shank, in which the elongated hollow cylinder has a centrally disposed orifice. The centrally disposed orifice of the grinder drill bit has a internal slightly diameter larger than the first diameter of the cylindrical proximate end of the guide rod, so that the cylindrical proximate end of the guide rod can be slidably inserted within the centrally disposed orifice of the elongated hollow cylinder of the grinder drill bit. Finally the grinder drill bit has a cutting element attached to the distal end of the elongated hollow cylinder for grinding or cutting a fresh surface around the existing threaded bolt hole.

There has thus been outlined, rather broadly, the more important features of the invention in order that the detailed description thereof that follows may be better understood, and in order that the present contribution of the art may be better appreciated.

The invention may also include an optional guide hole in the cylindrical proximate end of the guide rod. There are of course, additional features of the invention that will be described hereinafter and which will form the subject matter of the claims attached.

Numerous objects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tool kit that has all the advantages of the prior art tool kit and none of the disadvantages.

It is another object of the present invention to provide a new and improved tool kit that may be easily and efficiently manufactured and marketed.

An even further object of the present invention is to provide a new and improved tool kit that has a low cost of manufacture with regard to both materials and labor, and which accordingly is then susceptible of low prices of sale to the consuming public, thereby making such multipurpose storage unit and system economically available to the buying public.

Still another object of the present invention is to provide a new tool kit that provides in the apparatuses and methods of the prior art some of the advantages thererof, while simultaneously overcoming some of the disadvantages normally associated therewith.

Even still another object of the present invention is to provide a tool kit having a guide rod which is slidably insertable into a grinding drill bit. These elements make it possible to align the grinding drill bit with the bolt hole so that the grinding drill bit may cut or grind a fresh surface around the bolt hole.

Lastly, it is an object of the present invention to provide a new and improved method of using the tool kit comprises the steps of activating, attaching, blowing, choosing, cutting, identifying, obtaining, locking, plugging, pressing, pulling, screwing, sliding, turning, and unscrewing.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DETAILED DESCRIPTION OF THE PREFERRED EMBODIMENT

Figure 1:
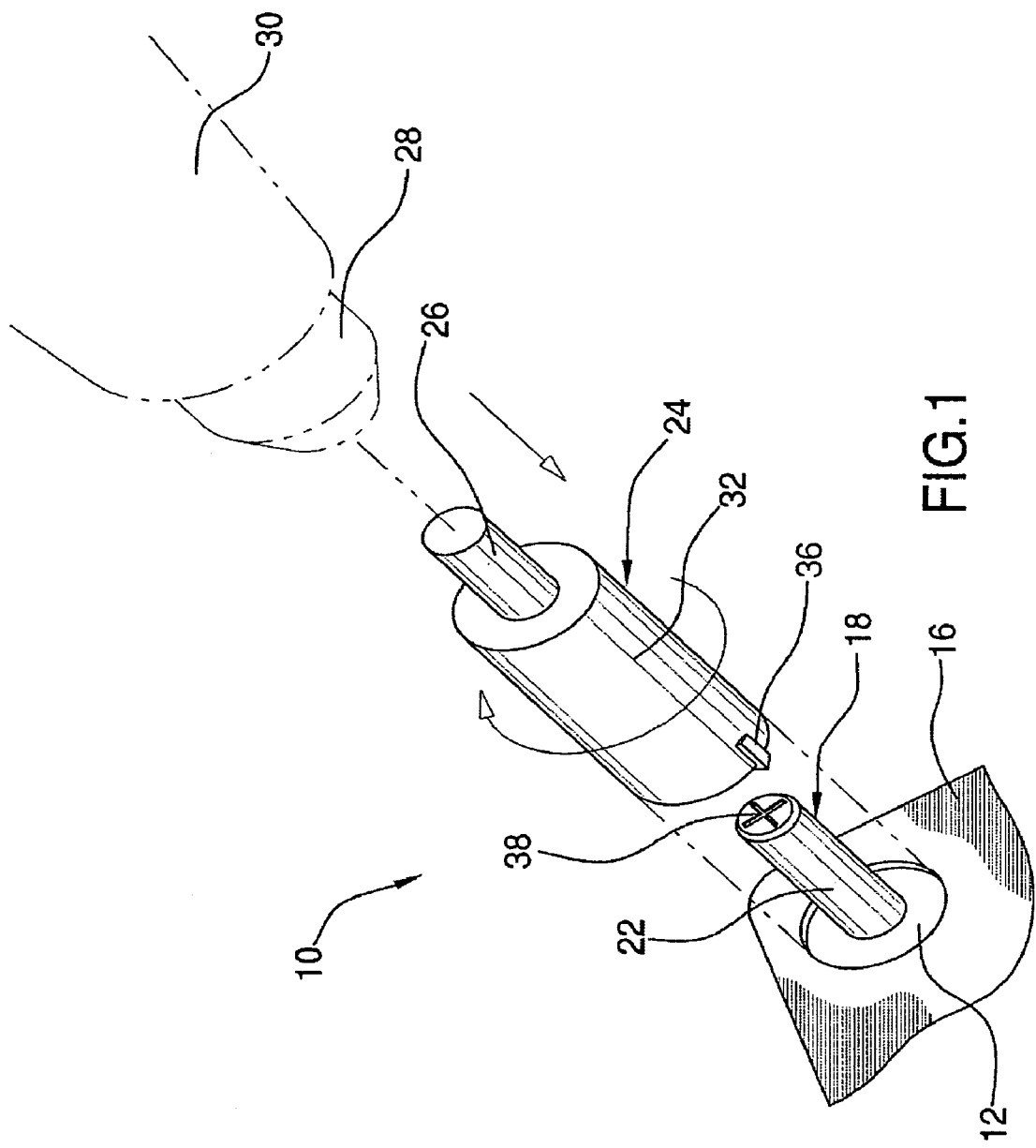
FIG. 1 is a perspective view of a preferred embodiment of the tool kit constructed in accordance with the principles of the present invention.
Figure 2:
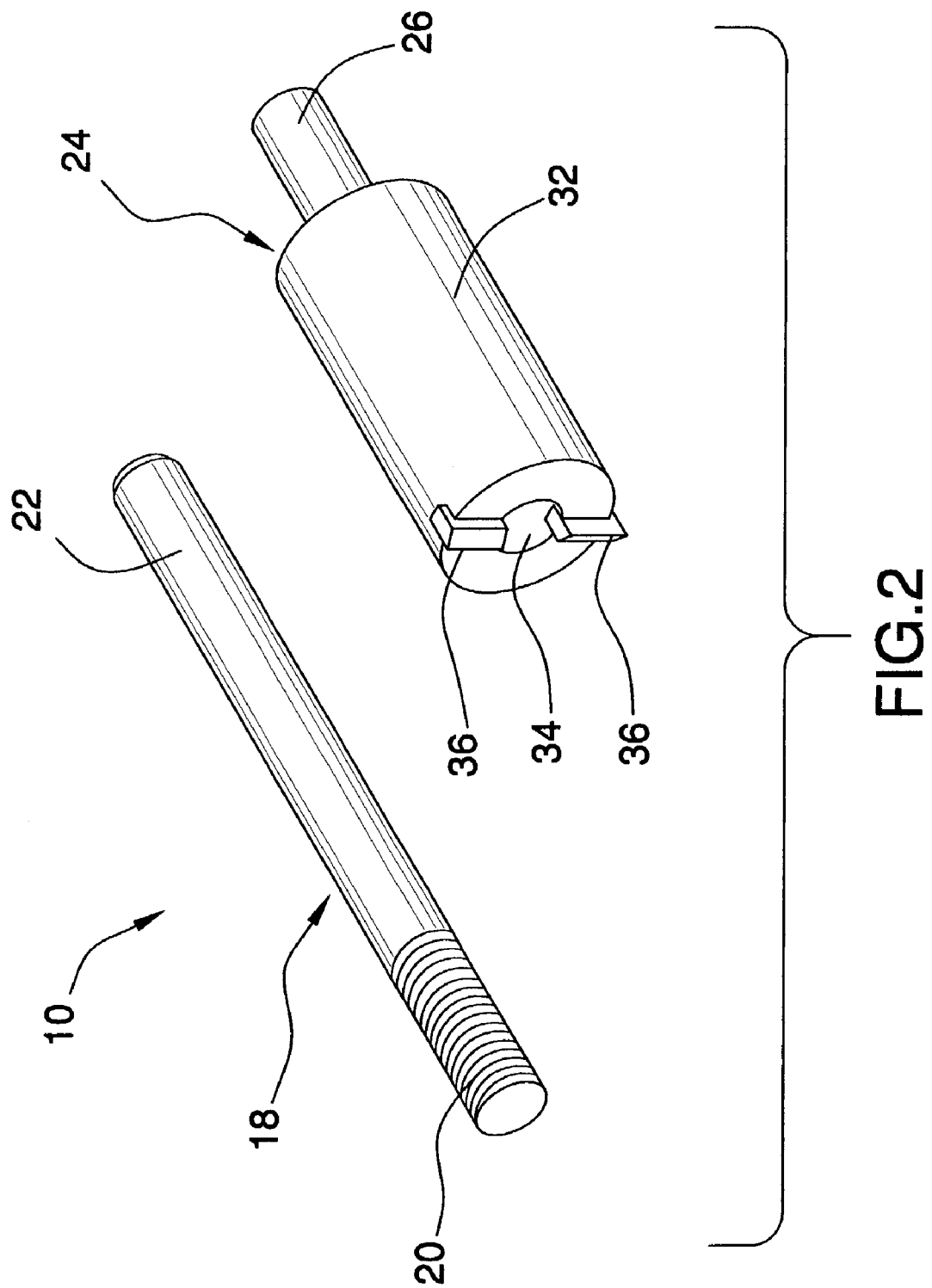
FIG. 2 is a perspective view of a preferred embodiment of the tool kit of the present invention.
Figure 3:
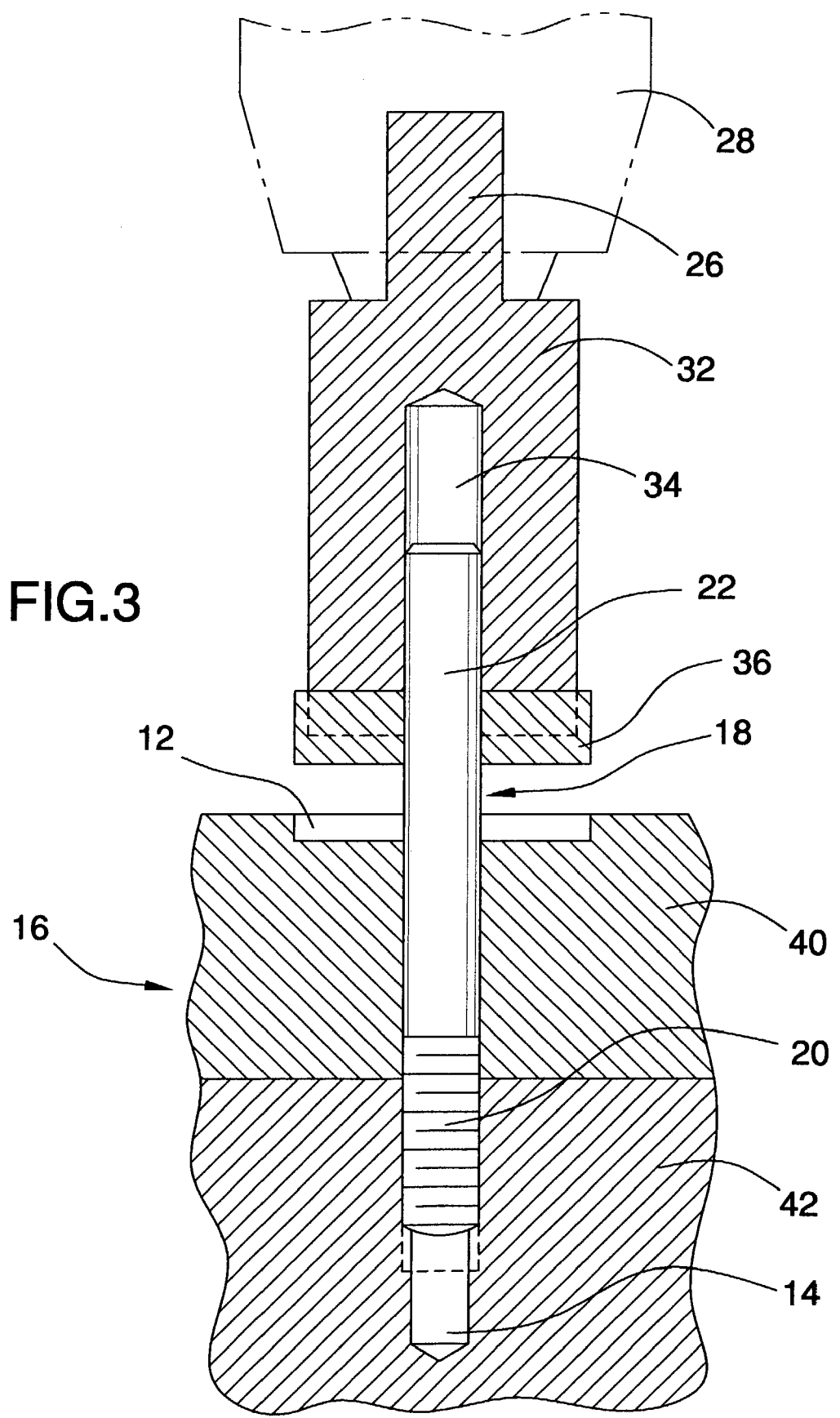
FIG. 3 is a cross sectional side view of a preferred embodiment of the the tool kit of the present invention.

Referring now to the drawings, and in particular FIGS. 1 to 3 thereof, one preferred embodiment of the present invention is shown and generally designated by the reference numeral 10. One preferred embodiment of the tool kit 10 for use in making a substantially perpendicular indented surface 12 around an existing threaded bolt hole 14 in a workpiece 16, the kit 10 comprises: a guide rod 18 including a threaded distal end 20 that threadedly fits within the threaded bolt hole 14 of the workpiece 16, and a cylindrical proximate end 22 having a first diameter; and a grinder drill bit 24 including: a shank 26 adapted to be coupled to a shank lock 28 of an electrical drill 30; an elongated hollow cylinder 32 attached to the shank 26, the elongated hollow cylinder 32 having a centrally disposed orifice 34, the centrally disposed orifice 34 having a internal diameter larger than the first diameter of the cylindrical proximate end 22 of the guide rod 18, wherein the cylindrical proximate end 22 of the guide rod 18 is slidably insertable within the centrally disposed orifice 34 of the elongated hollow cylinder 32 of the grinder drill bit 24; and a cutting element 36 attached to the distal end of the elongated hollow cylinder 32.

Another preferred embodiment of the tool kit 10 consist essentially of: a guide rod 18 having a threaded distal end 20 that threadedly fits within the threaded bolt hole 14 of the workpiece 16, and a cylindrical proximate end 22 having a first diameter; and a grinder drill bit 24 having a shank 26 adapted to be coupled to a shank lock 28 of an electrical drill 30; an elongated hollow cylinder 32 attached to the shank 26, the elongated hollow cylinder 32 having a centrally disposed orifice 34, the centrally disposed orifice 34 having a internal diameter larger than the first diameter of the cylindrical proximate end 22 of the guide rod 18, wherein the cylindrical proximate end 22 of the guide rod 18 is slidably insertable within the centrally disposed orifice 34 of the elongated hollow cylinder 32 of the grinder drill bit 24; and a cutting element 36 attached to the distal end of the elongated hollow cylinder 32.

The cutting element 36 may be any commercially known material that is capable of grinding or cutting into some metals, in particular cutting into engine blocks 42, intake manifolds 40, cylinder head from an automobile engine, etc. One preferred configuration of the cutting element 36 is that it comprises a pair of hardened metal blades. Another preferred configuration of the hardened metal blades is that they are made of carbide steel. Another preferred configuration of the cutting element 36 is that they comprise a plurality of diamond particles.

An optional guide hole 38 in the cylindrical proximate end 22 of the guide rod 18 may be added to the kit. The optional guide hole 38 may be any number of different shapes. One preferred configuration of the guide hole 38 is that it is hexagonally shaped, in which the hexagonal guide hole 38 is adapted to fit the head of an Allen wrench. Another preferred configuration of the guide hole 38 is that it is straight, wherein the straight guide hole 38 is adapted to fit the head of a flat head screwdriver. Still another preferred configuration of the guide hole 38 is that it is cross hatched, wherein the cross hatched guide hole 38 is adapted to fit the head of a Phillips screwdriver.

One preferred embodiment of the method of using a tool kit 10 for use in making a substantially perpendicular indented surface 12 around an existing threaded bolt hole 14 in a workpiece 16, the method comprising the steps of activating, attaching, blowing, choosing, cutting, identifying, obtaining, locking, plugging, pressing, pulling, screwing, sliding, turning, and unscrewing. The obtaining step comprises obtaining a kit 10 comprising: a guide rod 18 including a threaded distal end 20 that threadedly fits within the threaded bolt hole 14 of the workpiece 16, and a cylindrical proximate end 22 having a first diameter; and a grinder drill bit 24 including a shank 26 adapted to be coupled to a shank lock 28 of an electrical drill 30; an elongated hollow cylinder 32 attached to the shank 26, the elongated hollow cylinder 32 having a centrally disposed orifice 34, the centrally disposed orifice 34 having a internal diameter larger than the first diameter of the cylindrical proximate end 22 of the guide rod 18, wherein the cylindrical proximate end 22 of the guide rod 18 is slidably insertable within the centrally disposed orifice 34 of the elongated hollow cylinder 32 of the grinder drill bit 24; and a cutting element 36 attached to the distal end of the elongated hollow cylinder 32. The identifying step comprises identifying the workpiece 16 to be an intake manifold 40 from an automobile engine. The attaching step comprises attaching the intake manifold 40 onto the block 42 of the automobile engine. The choosing step comprises choosing a bolt hole 14 in the intake manifold 40 that the user determines needs to have a fresh surface around the chosen bolt hole 14. The screwing step comprises screwing the distal end of the guide rod 18 into the chosen bolt hole 14. The locking step comprises locking the shank 26 of the grinder drill bit 24 into a shank lock 28 of an electric grinder. The plugging step comprises plugging the electric drill into an electrical power source. The sliding step comprises sliding the cylindrical proximate end 22 of the guide rod 18 into the orifice 34 of the elongated hollow cylinder 32 of the grinder drill bit 24. The activating step comprises activating on the electric drill to enable the grinder drill bit 24 to turn around the guide rod 18. The pressing step comprises pressing the turning guide rod 18 onto the surface around the chosen bolt hole 14 of the intake manifold 40 to contact the grinding element to the surface around the chosen bolt hole 14 of the intake manifold 40. The cutting step comprises cutting into the surface around the chosen bolt hole 14 of the intake manifold 40 with the grinding element of the turning guide rod 18 of the grinder drill bit 24. The turning step comprises turning off the electric drill bit to stop the grinder drill bit 24 from turning around the guide rod 18. The pulling step comprises pulling the electric drill away from the intake manifold 40 by slidably disengaging the grinder drill bit 24 to the cylindrical proximate end 22 of the guide rod 18. The blowing step comprises blowing away any residual metal filings around the vicinity of the chosen bolt hole 14 of the intake manifold 40. The unscrewing step comprises unscrewing the distal end of the guide rod 18 from the chosen bolt hole 14.

Referring now to FIG. 1 which depicts a perspective view of a preferred embodiment of the tool kit 10 showing tool kit 10 being used to making a substantially perpendicular indented surface 12 around an existing threaded bolt hole 14 in a workpiece 16. The kit 10 is shown having a threaded distal end 20 of the guide rod 18 threadedly fitted within the threaded bolt hole 14 of the workpiece 16, in which the cylindrical proximate end 22 of the guide rod extends away from the workpiece. The grinder drill bit 24 is shown having a shank 26 adapted to be coupled to a shank lock 28 of an electrical drill 30; an elongated hollow cylinder 32 attached to the shank 26, the elongated hollow cylinder 32 having a centrally disposed orifice 34 (not shown), in which the centrally disposed orifice 34 having a internal diameter larger than the first diameter of the cylindrical proximate end 22 of the guide rod 18, wherein the cylindrical proximate end 22 of the guide rod 18 is slidably insertable within the centrally disposed orifice 34 of the elongated hollow cylinder 32 of the grinder drill bit 24; and a cutting element 36 attached to the distal end of the elongated hollow cylinder 32.

Referring now to FIG. 2 which depicts a perspective view of a preferred embodiment of the tool kit 10 showing the two component parts of the kit 10, i.e., the guide rod 18 and the grinder drill bit 24. The guide rod 18 is shown having a threaded distal end 20 that threadedly fits within the threaded bolt hole 14 of the workpiece 16, and a cylindrical proximate end 22 having a first diameter. The grinder drill bit 24 is shown having a shank 26 adapted to be coupled to a shank lock 28 of an electrical drill 30; an elongated hollow cylinder 32 attached to the shank 26, the elongated hollow cylinder 32 having a centrally disposed orifice 34, the centrally disposed orifice 34 having a internal diameter slightly larger than the first diameter of the cylindrical proximate end 22 of the guide rod 18, and a cutting element 36 attached to the distal end of the elongated hollow cylinder 32.

Referring now to FIG. 3 which depicts a cross sectional side view of a preferred embodiment of the tool kit 10 showing the threaded distal end 20 of the guide rod 18 t threadedly fitted within the threaded bolt hole 14 of the workpiece 16, and a cylindrical proximate end 22 extending away from the workpiece 16. The workpiece 16 is shown having the indented surface 12 around the bolt hole 14 made by the grinder drill bit 24. The grinder drill bit 24 is shown having a shank 26 coupled to a shank lock 28 of an electrical drill 30; and an elongated hollow cylinder 32 attached to the shank 26. The elongated hollow cylinder 32 is shown having a centrally disposed orifice 34, in which the centrally disposed orifice 34 having a internal diameter slightly larger than the first diameter of the cylindrical proximate end 22 of the guide rod 18 so that the cylindrical proximate end 22 of the guide rod 18 is able to be slidably inserted within the centrally disposed orifice 34 of the elongated hollow cylinder 32 of the grinder drill bit 24. The grinder drill bit 24 is also shown having a cutting element 36 attached to the distal end of the elongated hollow cylinder 32.

The same reference numerals refer to the same parts throughout the various figures.

As to the manner of usage and operation of the present invention, the same should be apparent from the above description. Accordingly, no further discussion relating to the manner of usage and operation will be provided.

While a preferred embodiment of the tool kit has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes or variations, thereof, or the them "having" or variations, thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combination any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tool kit for use in making a substantially perpendicular indented surface around an existing threaded bolt hole in a workpiece, said kit comprising:
    a guide rod including a threaded distal end that threadedly fits within the threaded bolt hole of the workpiece, and a cylindrical proximate end having a first diameter; and
    a grinder drill bit including
        a shank adapted to be coupled to a shank lock of an electrical drill;
        an elongated hollow cylinder attached to said shank, said elongated hollow cylinder having a centrally disposed orifice, said centrally disposed orifice having a internal diameter larger than the first diameter of the cylindrical proximate end of said guide rod, wherein said cylindrical proximate end of said guide rod is slidably insertable within said centrally disposed orifice of said elongated hollow cylinder of said grinder drill bit; and
        a cutting element attached to a distal end of said elongated hollow cylinder.

2. The kit described in claim 1 further comprising a guide hole in the cylindrical proximate end of said guide rod.

3. The kit described in claim 2 wherein said guide hole is hexagonal, wherein said hexagonal guide hole is adapted to fit the head of an Allen wrench.

4. The kit described in claim 2 wherein said guide hole is straight, wherein said straight guide hole is adapted to fit the head of a flat head screwdriver.

5. The kit described in claim 2 wherein said guide hole is cross hatched, wherein said cross hatched guide hole is adapted to fit the head of a Phillips screwdriver.

6. The kit described in claim 1 wherein said cutting element is a pair of hardened metal blades.

7. The kit described in claim 6 wherein said hardened metal blades are made of carbide steel.

8. The kit described in claim 1 wherein said cutting element is a plurality of diamond particles.

9. The kit described in claim 1 wherein the workpiece is an intake manifold from an automobile engine.

10. The kit described in claim 1 wherein the workpiece is a cylinder head from an automobile engine.

11. A tool kit for use in making a substantially perpendicular indented surface around an existing threaded bolt hole in a workpiece, said kit consisting essentially of:
    a guide rod having a threaded distal end that threadedly fits within the threaded bolt hole of the workpiece, and a cylindrical proximate end having a first diameter; and
    a grinder drill bit having
        a shank adapted to be coupled to a shank lock of an electrical drill;
        an elongated hollow cylinder attached to said shank, said elongated hollow cylinder having a centrally disposed orifice, said centrally disposed orifice having a internal diameter larger than the first diameter of the cylindrical proximate end of said guide rod, wherein said cylindrical proximate end of said guide rod is slidably insertable within said centrally disposed orifice of said elongated hollow cylinder of said grinder drill bit; and
        a cutting element attached to a distal end of said elongated hollow cylinder.

12. A method of using a tool kit for use in making a substantially perpendicular indented surface around an existing threaded bolt hole in a workpiece, said method comprising:
    obtaining a kit comprising:
        a guide rod including a threaded distal end that threadedly fits within the threaded bolt hole of the workpiece, and a cylindrical proximate end having a first diameter; and
        a grinder drill bit including
            a shank adapted to be coupled to a shank lock of an electrical drill;
            an elongated hollow cylinder attached to said shank, said elongated hollow cylinder having a centrally disposed orifice, said centrally disposed orifice having a internal diameter larger than the first diameter of the cylindrical proximate end of said guide rod, wherein said cylindrical proximate end of said guide rod is slidably insertable within said centrally disposed orifice of said elongated hollow cylinder of said grinder drill bit; and
            a cutting element attached to a distal end of said elongated hollow cylinder;
    identifying the workpiece to be an intake manifold from an automobile engine;
    attaching the intake manifold onto the block of the automobile engine;
    choosing a bolt hole in the intake manifold that the user determines needs to have a fresh bolt hole surface;

screwing the distal end of the guide rod into the chosen bolt hole;

locking the shank of the grinder drill bit into the shank lock of the electric drill;

plugging the electric drill into an electrical power source;

sliding the cylindrical proximate end of the guide rod into the orifice of the elongated hollow cylinder of the grinder drill bit;

activating on the electric drill to enable the grinder drill bit to turn around the guide rod;

pressing the turning grinder drill bit onto the surface around the chosen bolt hole of the intake manifold to contact the cutting element to the surface around the chosen bolt hole of the intake manifold;

cutting into the surface around the chosen bolt hole of the intake manifold with the cutting element of the turning grinder drill bit;

turning off the electric drill to stop the grinder drill bit from turning around the guide rod;

pulling the electric drill away from the intake manifold by slidably disengaging the grinder drill bit to the cylindrical proximate end of the guide rod;

blowing away any residual metal filings around the vicinity of the chosen bolt hole of the intake manifold; and unscrewing the distal end of the guide rod from the chosen bolt hole.

\* \* \* \* \*